March 1, 1966 F. M. WOOD 3,237,445
ULTRASONIC INSPECTION DEVICE
Filed Aug. 20, 1962 2 Sheets-Sheet 1
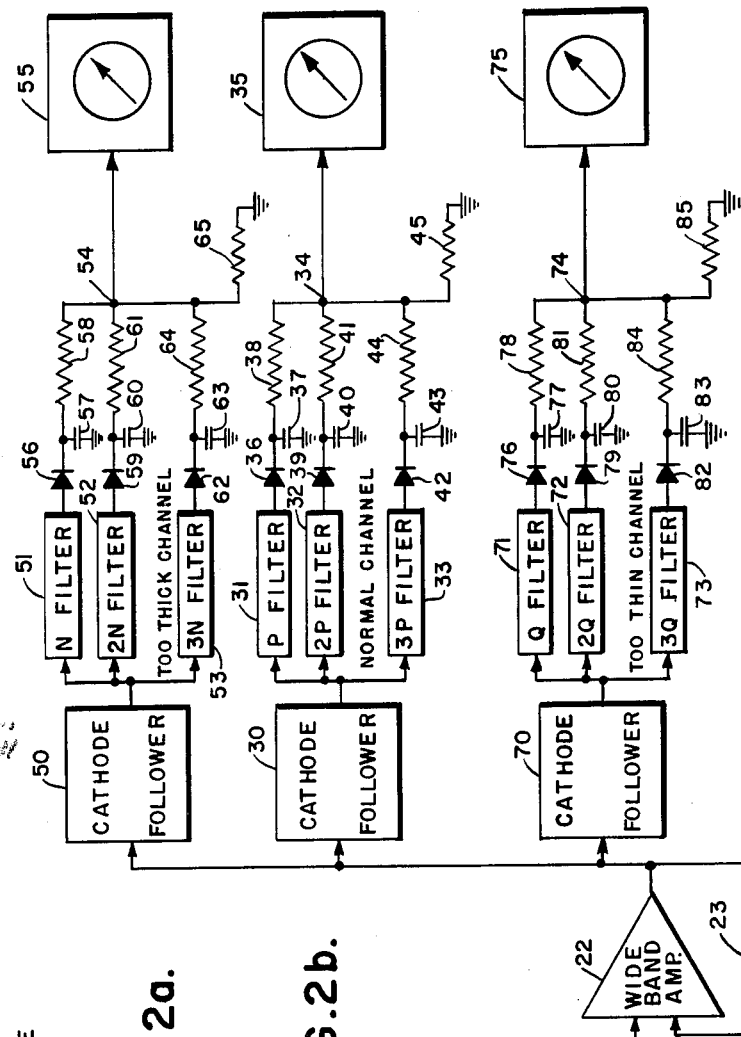
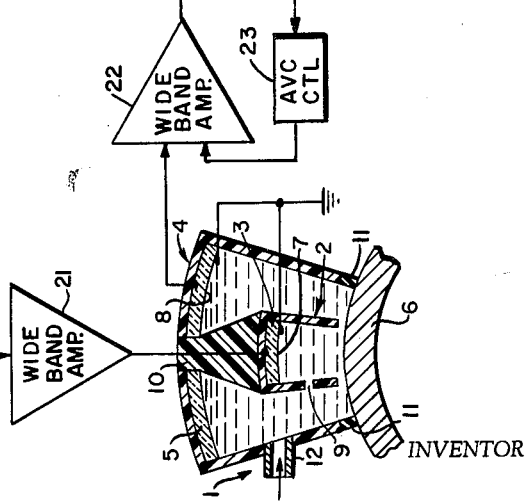
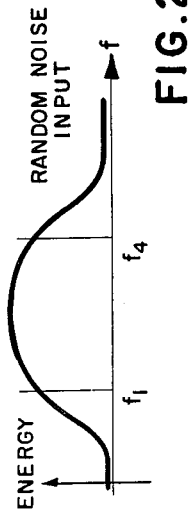
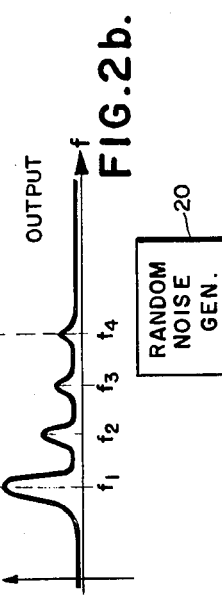
INVENTOR
Fenton M. Wood
BY
ATTORNEY

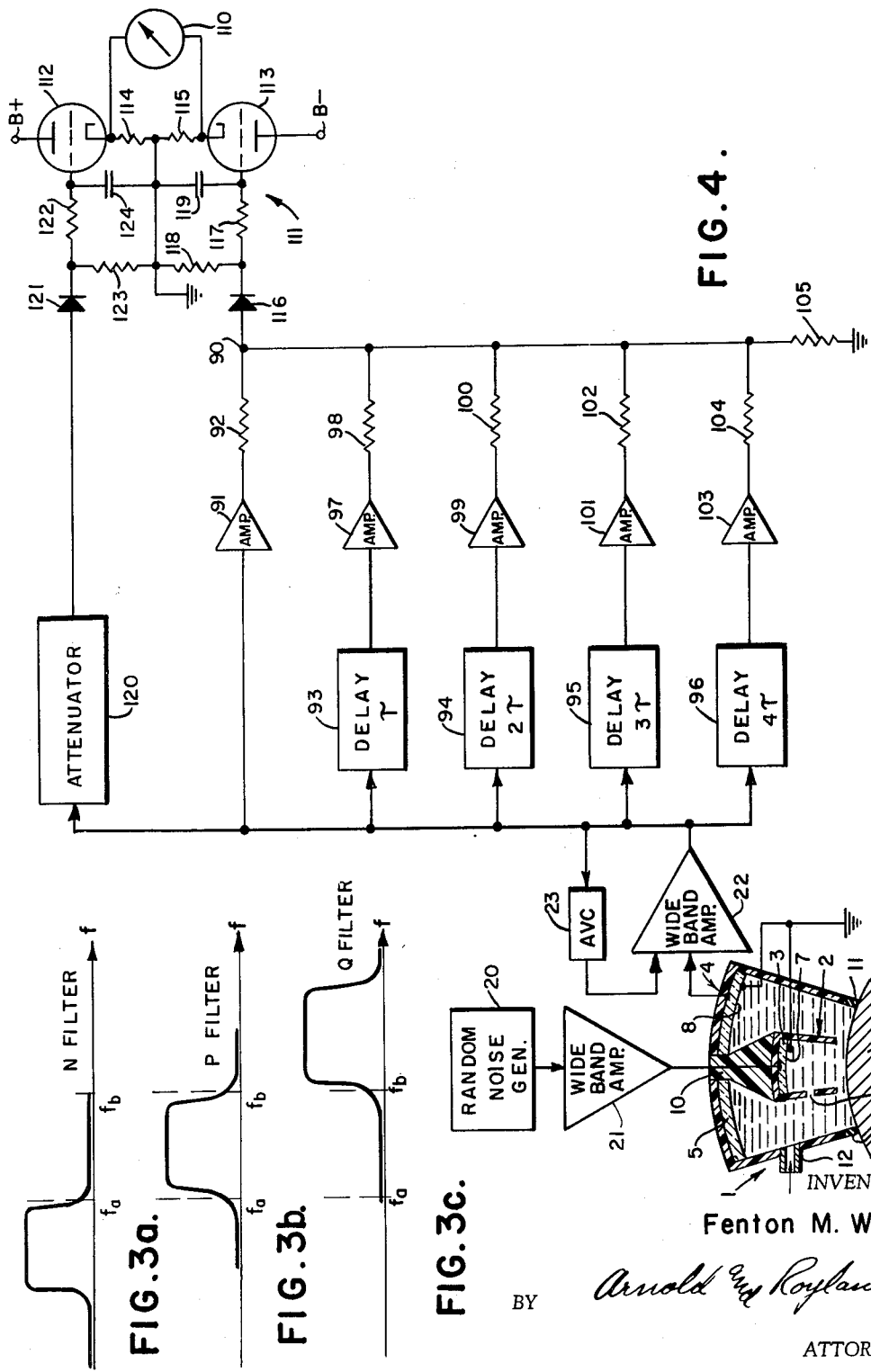

United States Patent Office 3,237,445
Patented Mar. 1, 1966

3,237,445
ULTRASONIC INSPECTION DEVICE
Fenton M. Wood, Sugarland, Tex., assignor, by mesne assignments, to American Machine & Foundry Company, New York, N.Y., a corporation of New Jersey
Filed Aug. 20, 1962, Ser. No. 217,793
17 Claims. (Cl. 73—67.5)

This invention relates to ultrasonic measuring apparatus and, more particularly, to such apparatus which determines thickness in accordance with the resonant frequency of the member being measured.

It is well known that any medium has a resonant frequency, and that this resonant frequency is a function of the dimensions of the medium. In ultrasonic systems, resonance occurs when the wave length of the ultrasonic energy applied is an integral multiple of the distance traveled by the energy through the member being measured. Thus, once the fundamental resonant frequency of the member is known, the thickness can be determined by the formula $t=c/f$, where $t$ is the thickness, $c$ is the speed of ultrasonic energy in the particular medium, and $f$ is the fundamental resonant frequency.

In most conventional systems, a transmitter of ultrasonic energy is coupled to the member being measured and is swept over a range of frequencies which include the fundamental resonant frequency and/or the harmonics thereof. The resonant frequencies are detected by noting at which frequencies maximum output signal or maximum transmitter reading occurs. The variable frequency transmitter required for such a system must be of precision construction and must be carefully calibrated if any reasonable measurement accuracy is to be attained.

This invention relates to an entirely new system for measuring thickness in accordance with the resonant frequency of the member being measured. The advantages of the new system are primarily in the cost reduction and the simplicity of operation without sacrifice in accuracy.

In essence, a wide band noise ultrasonic energy signal is induced in the member being measured, and resonance is detected by noting which of the component frequencies are attenuated least after the noise signal has passed through the member. The noise signal is such that a wide range of frequencies are more or less simultaneously induced into the member being measured, this range of frequencies being selected to include the fundamental resonance frequency of the member and/or harmonics thereof. The signal after passing through the member is substantially the same except that the non-resonance frequencies are more substantially attenuated than the resonant frequencies. Accordingly, the resonant frequencies are predominant in the output signal. The output circuits are responsive to the predominant frequencies emerging from the member being measured, and indicate thickness accordingly.

The invention is described in greater detail in the following specification and drawings which form a part of the specification, and wherein:

FIG. 1 is a schematic diagram of the apparatus in accordance with one embodiment of the invention;

FIGS. 2a and 2b are diagrams illustrating the energy-frequency distribution of the signal before, FIG. 2a, and after, FIG. 2b, passing through the member being measured;

FIGS. 3a–3c are diagrams illustrating the frequency characteristics of filter circuits forming a part of the FIG. 1 embodiment; and FIG. 4 is a schematic diagram of apparatus in accordance with another embodiment.

Referring to FIG. 1, the apparatus is illustrated including a transducer housing 1, having an inner transmitter shielding structure 2 which supports a transmitting transducer 3, and an outer liquid enclosing casing 4 which supports a receiving transducer 5. The housing maintains the transducers at appropriate positions with respect to the outer cylindrical surface of a tubular member 6, the wall thickness of which is being measured.

The transducers are constructed from a suitable piezoelectric material such as quartz. The transmitting surface 7 of the transmitting transducer, and the surface opposite the transmitting surface, are each coated with a metallic electric conducting film. Thus, when a potential is applied between the coated surfaces of the transmitting transducer, current flows through the transducer causing a corresponding change in transducer dimensions in accordance with the reverse piezoelectric effect. The receiving surface 8 of the receiving transducer, and the surface opposite are similarly coated. When the receiving transducer is vibrated by received ultrasonic energy, the receiving transducer provides a corresponding electrical output signal in accordance with the piezoelectric effect. The transmitting and receiving surfaces of the respective transducers are preferably shaped to conform with the adjacent surface of the member being measured. Accordingly, since the apparatus is illustrated as adapted to measure the wall thickness of a tubular member, the transmitting and receiving surfaces are curved so as to become concentric with the outer surface of the tubular member when the transducer housing is appropriately positioned.

The transmitting transducer is mounted on a suitably curved wall of transmitting shielding structure 2 which is a five-sided structure, preferably molded of Bakelite or other similar non-ultrasonic energy transmitting material. The shielding structure has four side walls integrally connected to the edges of the curved wall. Two of these side walls are spaced apart and parallel, the other two side walls being spaced apart and slanted to extend radially outwardly from member 6 when the housing is positioned. The transmitting transducer is securely cemented to the curved wall and portions of the side walls so as to obtain a highly damped transducer mounting. With such a transducer mounting, the transducer vibrates only in response to electrical energization, and does not continue to vibrate after energization ceases. One of the side walls is provided with a suitable aperature 9 which permits liquid to flow into the enclosure of the shielding structure.

The receiving transducer is mounted on a suitably curved wall of outer casing 4 which is constructed of Bakelite or similar material. The outer casing has a configuration generally similar to that previously described for the shielding structure. The dimensions of the outer casing are somewhat greater than those of the shielding structure, and, therefore, receiving transducer 5 is correspondingly larger and spaced at a geater distance from tubular member 6. Receiving transducer 5 has an aperture located approximately in the center of the transducer and of dimensions sufficient to accommodate an energy absorbing support structure 10. The support structure is securely fastened between the curved surface of outer casing 4 and shielding structure 2, and is preferably constructed of a plastic material which absorbs ultrasonic energy and, insofar as possible, prevents the ultrasonic energy generated by the transmitting transducer from effecting the receiving transducer.

The lower surfaces (as viewed) of the outer casing side walls generally conform to the external surface of tubular member 6. A rubber sealing strip 11 is secured to these surfaces adjacent the outer surface of the tubular member. An inlet 12 is provided in one of the side walls of the outer casing. The volume bounded by the outer casing and the external surface of tubular member 6, which includes the volume bounded by the shielding structure, is filled with a suitable acoustic coupling medium such as water mixed with a wetting agent which prevents air bubbles from forming. It is anticipated that some liquid will escape between sealing strips 11 and member 6, and, therefore, replacement liquid is continuously provided via inlet 12 to ensure that the enclosure is completely filled at all times.

The resonance affect of the coupling medium column, the liquid between the transmitting transducer surface 7 and the outside surface of pipe 6, can be substantially eliminated by conventional techniques. For example, the transducer can be damped, in accordance with the teachings of United States Patents 2,416,337; 2,421,026; and 2,427,348; and the liquid column can be damped, in accordance with the teachings of United States Patents 2,431,862 and 2,483,821. Also, by slightly tilting the transmitting transducer out of parallel with pipe 6, the reverberation in the coupling medium column can be minimized.

The input to transmitting transducer 3 is an electrical signal having a wide band of simultaneously generated frequencies. The illustrated circuits for energizing the transmitting transducer include a random noise generator 20 connected to one of the coated surfaces of transmitting transducer 3 via a wide band amplifier 21, the other coated surface of the transmitting transducer being connected to ground. The random noise generator 20 produces an electrical output signal characterized by a large number of overlapping transient disturbances occurring at random. The output signal can be continuous and contains a wide band of frequencies at a substantial energy level. A typical energy-frequency relationship for a random noise generator is illustrated by the graph of FIG. 2a. A straight line, either horizontal or inclined, energy-frequency relationship, falling off at the ends, can be utilized.

The random noise generator 20 may be of several conventional designs that are commercially available. For example, a gas-discharge tube with a transverse magnetic field applied can be used as a noise source to produce a substantially flat energy-frequency spectrum.

One of the primary advantages of the use of a continuous random frequency generator 20 is the high energy level signal produced by transmitting transducer 3 that "hammers" on pipe 6. A substantial power can be delivered to the transmitting transducer 3 without exceeding the breakdown voltage of a crystal, for example. This results in a high signal-to-noise ratio in the receiving transducer 5. Although a radio-frequency amplifier and detector could be placed in the circuit following the receiving transducer 5, the high signal-to-noise ratio achieved with the continuous random frequency generator 20 permits the elimination of these stages without serious loss of inspection capability.

The frequency distribution of the random noise input includes the fundamental resonant frequency $f_1$, corresponding to the thickness being measured, as well as several harmonics thereof ($f_2$, $f_3$, and $f_4$). As will be explained hereinafter, it is not necessary that the fundamental resonant frequency be included in the frequency distribution curve, since the apparatus can be adapted to operate in response to any group of harmonic frequencies. In instances where the apparatus is utilized to measure the thickness of relatively large members, the fundamental resonant frequency of the member may be below the range of frequencies which are suitable for ultrasonic type apparatus, and, therefore, the apparatus must be adapted for operation in accordance with the higher harmonic frequencies. Wide band amplifier 21 is of conventional design and is capable of amplifying all of the electrical frequency signals provided by the random noise generator.

When the electrical noise signal is applied to the transmitting transducer, the transmitting transducer vibrates creating corresponding compression waves in the coupling medium. In other words, ultrasonic energy is generated and propagated toward the member 6 through the coupling medium. This ultrasonic energy passes through the wall of tubular member 6, is reflected off the inner surface of the tubular member, and then returns to receiving transducer 5 through the wall of the tubular member and the coupling medium. The output signal generated by the receiving transducer is the same as that previously transmitted, except that the portions of the signal at the resonant frequencies of the tubular member wall are much less attenuated than the portions of the signal at the non-resonant frequency. The resonant frequencies are those which have a wave length equal to an integral multiple of the distance traveled through the wall of tubular member 6, this distance traveled being directly proportional to the wall thickness. The frequency distribution of the output signal as developed by the receiving transducer is as shown in the "output" curve shown in FIGS. 2a and 2b. It should be noted, that a substantial portion of the output signal has a frequency $f_1$, which is the fundamental resonant frequency of the tubular member. Also, there are substantial portions of the signal at frequencies $f_2$, $f_3$, and $f_4$ which are the harmonics of this fundamental resonant frequency. Thus, the fundamental resonant frequencies and harmonics thereof are predominant in the output signal.

One of the coated surfaces of receiving transducer 5 is connected to the input of the wide band amplifier 22, the other coated surface being connected to ground. Wide band amplifier 22 is of a conventional variable gain design which can amplify all of the frequency components making up the random noise signal. The gain of this amplifier is controlled by an automatic volume control circuit 23 connected between the output of the amplifier and a gain control input. The volume control circuit is so connected that the gain of the amplifier circuit increases as the output from the amplifier decreases, in accordance with conventional AVC circuit techniques.

The frequency responsive portion of the apparatus is divided into three separate channels referred to as the "too thick channel," the "normal channel" and the "too thin channel." Each of these channels are essentially the same except that they are responsive to different sets of frequencies.

The "normal channel" includes a cathode follower circuit 30, the input of which is connected to wide band amplifier 22. The output of the cathode follower circuit is connected to three separate electrical band pass filter circuits 31–33. The frequency characteristics of filter circuit 31 are illustrated in FIG. 3b. This filter circuit has no substantial effect on frequencies in the range between $f_a$ and $f_b$, but greatly attenuates all frequencies outside this range. Band pass filter circuit 32 is similar to filter circuit 31, but is constructed to pass the second harmonics of the frequencies passed by filter circuit 31. Band pass filter 33 is constructed to pass the corresponding third harmonic frequencies.

The signals which pass through filter circuits 31–33 are rectified, averaged and summed, and then applied to a meter 35. The output of filter circuit 31 is connected to a junction 34 through a diode 36, which performs the rectifying function, and a series connected resistor 38 which is part of the summation circuit. A filter capacitor 37 is connected to the junction between diode 36 and resistor 38 and to ground. The capacitor smooths the rectified signal and thus performs the averaging function. In similar fashion, the output of filter circuit 32 is connected to junction 34 by means of a diode 39, a capacitor 40 and a resistor 41. Filter circuit 33 is similarly connected to junction 34 by means of a diode 42, a capacitor 43 and a resistor 44. A resistor 45 is connected between junction 34 and ground, and, therefore, resistors 38, 41 and 44 form a summation circuit with resistor 45 such that the potential appearing at junction 34 is the sum of the rectified outputs from each of the individual filter circuits. Junction 34 is connected to the input of a direct current voltage responsive meter 35. The direction in which diodes 36, 39 and 42 are poled is immaterial so long as all diodes are poled in the same direction and so long as meter 35 is connected to respond to the polarity of the rectified signal.

It is assumed that there is a range of desired or acceptable wall thickness dimensions. The band pass frequency range of filter circuit 31, i.e., the range of frequencies between $f_a$ and $f_b$, is such that the filter passes the fundamental resonant frequencies corresponding to the acceptable range of dimensions. Filter circuits 32 and 33 pass the harmonics of these fundamental resonant frequencies. Accordingly, if the wall thickness is within the accepted range, the predominant frequencies in the signal generated by the receiving transducer will be those which pass through filter circuits 31–33, and, therefore, meter 35 provides a maximum indication under these circumstances. If the wall thickness is outside the accepted range of dimensions, the predominant frequency portions of the output signal will be substantially attenuated by filter circuits 31–33 and the meter indication decreases accordingly. It is not necessary that filter circuits 31–33 be tuned to the fundamental resonant frequencies and harmonics thereof, since it is obvious that the apparatus will function equally as well when the filter circuits are tuned to any group of harmonic resonant frequencies corresponding to the accepted range of wall thickness dimensions.

The "too thick channel" is similar to the "normal channel" except for the band-pass frequencies of the filter circuits. The "too thick channel" includes a cathode follower circuit 50 connected between each of the band-pass filter circuits 51–53 and the output of wide band amplifier 22. As is illustrated in FIG. 3a, filter circuit 51 has no substantial effect on a band of frequencies just below the frequency $f_a$, but attenuates all other frequencies. Band-pass filter circuit 52 passes the second harmonics of the frequencies which are passed by filter circuit 51, and band-pass filter circuit 53 passes the corresponding third harmonic frequencies. The outputs of filter circuits 51–53 are rectified, averaged, and summed and then applied to a direct current voltage responsive indicating meter 55. More specifically, the output of filter 51 is connected to a junction 54 through a diode 56 and a series connected resistor 58. A filter capacitor 57 is connected to the junction between diode 56 and a resistor 58 and to ground. Similarly, the output of filter circuit 52 is connected to junction 54 via diode 59, capacitor 60 and resistor 61, and filter circuit 53 is connected to the same junction through diode 62, capacitor 63 and resistor 64. A resistor 65 is connected between junction 54 and ground such that the resistors 58, 61 and 64 form a voltage summation circuit. Meter 55 is connected to junction 54. Thus, if the wall thickness is somewhat greater than the range of dimensions which produce an indication on meter 35, the resonant frequencies will be somewhat lower and pass through filter circuits 51–53 to provide a maximum indication on meter 55.

The "too thin channel" is similar and includes three filter circuits 71–73. The frequency characteristics of the filter circuit 71 are shown in FIG. 3c. As illustrated, filter circuit 71 passes a narrow band of frequencies junst above the frequency $f_b$. Filter circuit 72 passes the corresponding second harmonics, and filter circuit 73 passes the corresponding third harmonics. A cathode follower circuit 70 is connected between the filter circuits and the output of wide band amplifier 22. The outputs from the filter circuits are connected to a junction 74 via diodes 76, 79 and 82, capacitors 77, 80 and 83, and resistors 78, 81 and 84, in essentially the same manner as the other filter circuits are connected respectively to junctions 54 and 34. A resistor 85 is connected between junction 74 and ground, and a direct current voltage responsive meter 75 is connected to junction 74. If the wall thickness is less than those dimensions included in the accepted range, the predominant frequencies in the receiving transducer output signal are somewhat higher than those frequencies which pass through filter circuits 31–33. These higher frequencies pass through filters 71–73 and meter 75 provides a corresponding indication.

Accordingly, if meter 35 provides a substantial indication, and meters 55 and 75 provide nominal indications, the wall thickness is within the accepted range. If meter 55 provides the only substantial indication, the wall thickness is greater than those accepted and, if meter 75 provides the only substantial indication, the wall thickness is less than those accepted. If two of the meters simultaneously provide a substantial indication, the wall thickness is on the borderline between an acceptable dimension and one which is either too thick or to thin.

FIG. 4 schematically illustrates another embodiment of the invention wherein an auto-correlation detection circuit is used in place of the frequency filter detection circuits of FIG. 1. Many of the components are essentially the same as those previously described, and, therefore, similar reference numerals are utilized for the transducers, the transducer housing, the energizing circuits, and the output amplifier connected to the receiving transducer. These units function in the same manner as previously described with regard to FIG. 1.

The auto-correlation circuit is tuned to provide a maximum output indication at a junction 90 when the tubular member wall has a certain preselected desired thickness. The output of wide band amplifier 22 is connected to junction 90 via an amplifier circuit 91 and a resistor 92 connected in series. The output of wide band amplifier 22 is also connected to junction 90 through fixed time delay circuits 93–96. The time delay $\tau$ provided by time delay circuit 93 is equal to the reciprocal of the fundamental resonant frequency corresponding to the preselected wall thickness. The time delay provided by circuits 94, 95 and 96 are two, three and four times as great, respectively, as the time delay provided by circuit 93. The time delay circuits 93, 94, 95, and 96 are connected to junction 90, respectively, via amplifiers 97, 99, 101, 103 and series connected resistors 98, 100, 102, and 104. Junction 90 is connected to ground via a resistance 105. Resistances 92, 98, 100, 102, and 104 form a summation circuit with resistance 105 such that the signal appearing at junction 90 is the sum of the signals passing through amplifiers 91, 97, 99, 101, and 103.

In explaining the operation of the auto-correlation circuit, it is first assumed that the wall of tubular member 6 is of the preselected desired thickness, and, therefore, that predominant frequencies of the output signal which pass through wide band amplifier 22 are those to which the auto-correlation circuit is tuned. The fundamental resonant frequency reaches junction 90 via amplifier 91 and resistance 92. At a time $\tau$ thereafter, the same signal arrives at junction 90 via time delay circuit 93. The time delay $\tau$ is equal to the reciprocal of the fundamental resonant frequency and, therefore, is equal to the time interval corresponding to 360 electrical degrees thereof. Under these circumstances, the two signals are additive in the summation circuit and the delayed signal which passes through delay circuit 93 enhances the direct signal which passes through amplifier 91 and resistance 92. The portions of the fundamental resonant frequency signal which pass through delay circuits 94–96 are delayed by integral multiples of $\tau$ and, therefore, these signals are similarly additive in the summation circuit. The harmonics of the fundamental resonant frequency are delayed by intergral multiples of the time interval corresponding to 360 electrical degrees thereof, and are therefore similarly additive at junction 90. Therefore, when the wall is of the preselected desired thickness, all of the predominant frequencies of the signal passing through the auto-correlation detector are additive and the signal at junction 90 attains a maximum value.

As the wall thickness deviates from the desired dimension, the predominant frequencies of the signal applied to the auto-correlation circuit change. Under these circumstances, the time delays provided circuits 94-96 are no longer integral multiples of the one cycle time interval of these frequencies and, therefore, cancellation of signals takes place in the summation circuit. As the deviation from the preselected desired wall thickness increases, the cancellation of signals increases and the magnitude of the signal at the junction 90 decreases accordingly.

A direct current voltage responsive indicating meter 110 is connected to the output of a balanced amplifier circuit 111. This amplifier circuit includes two conventional triode amplifying tubes 112 and 113 which are each connected as cathode follower amplifiers. The cathode of tube 112 is connected to ground via a resistor 114, and the cathode of tube 113 is similarly connected to ground via a resistor 115. Meter 110 is connected between the cathodes. The signal appearing at junction 90 is rectified, averaged, and then applied to the control grid of tube 113. More specifically, the control grid of tube 113 is connected to junction 90 via a diode 116, which performs the rectifying function, and series connected resistance 117. The cathode of diode 116 is also connected to ground via a resistance 118, the anode thereof being connected to junction 90. A filter capacitor 119 is connected between the control grid of tube 113 and ground to average the rectified signal from diode 116. The output of wide band amplifier 22 is connected to the control grid of tube 112 via an attenuator circuit 120, a diode 121 and a resistance 122, these components being connected in series. The cathode of diode 121 is connected to ground via a resistance 123, the anode thereof being connected to output of attenuator circuit 120. A filter capacitor 124 is connected between the control grid of tube 112 and ground. Diode 121, therefore, rectifies the signal from amplifier 22, the capacitor 124 averages and rectified signal. The various components connected to tube 112 corresponding to similar components connected to tube 113 have respective identical values to thus form a balanced amplifier.

Attenuator circuit 120 is so adjusted that when the signal at junction 90 is of a maximum value, the potential appearing at the cathode of tube 112 is equal to the potential appearing at the cathode of tube 113. Thus, when the signal at junction 90 is maximum, corresponding to the presence of a tubular member wall having the desired preselected thickness, the indication on meter 110 is approximately zero. As the wall thickness deviates from the preselected value, the predominant frequencies of the output signal change, but the mean value is essentially the same, and therefore the potential at the cathode at the tube 112 does not vary. However, as has been previously explained, this deviation causes a decrease in the signal at junction 90, and, therefore, tube 113 becomes less conductive and the potential at the cathode of tube 113 decreases accordingly. The indication provided by meter 110, therefore, increases as the wall thickness deviates from the desired preselected value. Accordingly, the indication on meter 110 is minimum when the wall thickness has the desired preselected value, and increases in accordance with the deviation from this value.

While several illustrative embodiments of the invention have been described in detail, these are by no means all of the possible embodiments of the invention. It should be obvious to those skilled in the art that numerous changes could be made without departing from the scope of the invention. The scope of the invention is more clearly defined in the appended claims.

What is claimed is:
1. In ultrasonic measuring apparatus, the combination of
   means acoustically coupled to the surface of a member being measured for substantially simultaneously inducing therein uniform ultrasonic energy having a wide band frequency distribution in a direction substantially perpendicular to said surface;
   a transducer acoustically coupled to the member and responsive to said ultrasonic energy after passing through the member to provide corresponding electrical signals having predominant frequency components corresponding to the resonant frequencies of the member;
   a plurality of frequency responsive circuit means each connected to said transducer and each responsive to an integral multiple of predominant frequencies corresponding to different predetermined ranges of member dimensions; and
   indicating means connected to said plurality of circuit means to indicate which one of said frequency responsive circuit means detects the predominant frequencies.

2. In ultrasonic measuring apparatus, the combination of
   means acoustically coupled to a member being measured for substantially simultaneously inducting therein uniform ultrasonic energy over a wide band frequency distribution;
   a transducer acoustically coupled to the member and responsive to said ultrasonic energy after passing through the member to provide corresponding electrical signals having predominant frequency components corresponding to the resonant frequencies of the member; and
   correlation detection means connected to said transducer and primarily responsive to predominant frequencies of said member corresponding to a certain preselected dimension, said detection means comprising
      at least one electrical time delay circuit providing an electrical time delay equal to an integral multiple of the one cycle time duration of one of said predominant frequencies corresponding to said certain preselected dimension,
      summation circuit means for adding the electrical signals provided by said transducer to the same electrical signals after passing through said delay circuit, and
      indicating means connected to said summation circuit and responsive to the magnitude of the summation signal to indicate the deviation of the dimension being measured from said preselected dimension.

3. The apparatus in accordance with claim 2 wherein said detection circuit further comprises
   an additional plurality of electrical time delay circuits for providing electrical time delays which are integral multiples of the time delay provided by the other delay circuit,
   and wherein said summation circuit adds the electrical signals from said transducer to the same signals after passing separately through each of said delay circuits.

4. The method of determining the distance between two surfaces of a member to be measured comprising the steps of
   substantially simultaneously inducing in the member, and in a direction substantially perpendicular to at least one of the surfaces of the member, uniform ultrasonic energy of different frequencies of a wide band range,
   detecting at which of these frequencies resonance occurs, and
   determining the distance between the surfaces as a function of the detected resonant frequencies.

5. The method of claim 4, wherein said different frequencies are continuously introduced in the member.

6. In ultrasonic measuring apparatus, the combination of means acoustically coupled to a member being measured for substantially simultaneously inducing therein uniform ultrasonic energy having a wide band frequency distribution, said energy being induced in a direction substantially perpendicular to a surface of said member;

a transducer acoustically coupled to the member and responsive to said uniform ultrasonic energy after passing through the member to provide corresponding electrical signals having predominant frequency components corresponding to the resonant frequencies of the member; and circuit means connected to said transducer responsive to properties of said resonant frequencies to provide an indication of the dimensions of said member corresponding to said resonant frequencies.

7. The apparatus in accordance with claim 6, wherein said circuit means is a correlation detection circuit.

8. The apparatus in accordance with claim 6, wherein said inducing means produces a continuous random noise over said wide band.

9. In ultrasonic measuring apparatus, the combination of a transmitting transducer acoustically coupled to a member being measured, said transducer having a surface substantially parallel to a surface of said member;

means for so energizing said transmitting transducer that uniform ultrasonic energy over wide band frequency distribution is substantially simultaneously and continuously induced in the member;

a receiving transducer acoustically coupled to the member and responsive to said ultrasonic energy after passing through the member to provide electrical signals having predominant frequency components corresponding to the resonant frequency of the member being measured; and circuit means connected to said receiving transducer responsive to properties of said resonant frequency to provide an indication of the dimension of said member corresponding to said resonant frequency.

10. The apparatus in accordance with claim 9, wherein said circuit means is a correlation detection circuit.

11. The apparatus in accordance with claim 9, wherein said circuit means comprises a plurality of band pass filters responsive to different integral multiples of predominant frequency components corresponding to preselected dimensions.

12. The apparatus in accordance with claim 9, wherein said energizing means produces a continuous random noise over said wide band.

13. In ultrasonic measuring apparatus, the combination of means acoustically coupled to a member being measured for substantially simultaneously inducing therein uniform ultrasonic energy over a wide band frequency distribution in a direction substantially perpendicular to a surface of said member;

a transducer acoustically coupled to the member and responsive to said ultrasonic energy after passing through the member to provide corresponding electrical signals having predominant frequency components corresponding to the resonant frequency of the member;

circuit means connected to said transducer responsive to properties of said resonant frequency to provide an indication of the dimension of said member corresponding to said resonant frequency; and indicating means connected to said responsive circuit means to indicate when frequency components corresponding to said preselected dimension are detected.

14. The apparatus in accordance with claim 13, wherein said circuit means is a correlation detection circuit.

15. The appartus in accordance with claim 13, wherein said circuit means comprises a plurality of band pass filters responsive to different integral multiples of predominant frequency components corresponding to preselected dimensions.

16. In ultrasonic measuring apparatus, the combination of means acoustically coupled to a member being measured for substantially simultaneously inducing therein ultrasonic energy having a wide band frequency distribution;

a transducer acoustically coupled to the member and responsive to said ultrasonic energy after passing through the member to provide corresponding electrical signals having predominant frequency components corresponding to the resonant frequencies of the member;

a plurality of frequency responsive circuit means each connected to said transducer and each responsive to an integral multiple of predominant frequencies corresponding to different predetermined ranges of member dimensions, said plurality of circuit means each comprising a plurality of electrical band pass filters responsive to integral multiples of the same frequencies; and indicating means connected to said plurality of circuit means to indicate which one of said frequency responsive circuit means detects the predominant frequencies.

17. In ultrasonic measuring apparatus, the combination of means acoustically coupled to a member being measured for substantially simultaneously inducing therein uniform ultrasonic energy having a wide band frequency distribution;

a transducer acoustically coupled to the member and responsive to said ultrasonic energy after passing through the member to provide corresponding electrical signals having predominant frequency components corresponding to the resonant frequencies of the member; and circuit means connected to said transducer responsive to properties of said resonant frequencies to provide an indication of the dimensions of said member corresponding to said resonant frequencies, said circuit means comprising a plurality of groups of band pass filters, each of said groups being responsive to a predominant frequency component corresponding to a preselected dimension such that each filter in one said group is responsive to a different integral multiple of said predominant frequency component.

References Cited by the Examiner

UNITED STATES PATENTS

| 2,431,234 | 11/1947 | Rassweiler et al | 73—67.8 |
| 2,876,638 | 3/1959 | Diamond | 73—67.2 |
| 2,946,217 | 7/1960 | Fruengel | 73—67.5 |
| 3,015,949 | 1/1962 | Arnold | 73—67.2 X |
| 3,029,385 | 4/1962 | Steinbrenner et al. | 73—67.2 X |
| 3,043,132 | 7/1962 | Schubring | 73—67.2 |
| 3,120,120 | 2/1964 | Worlton et al. | 73—67.2 X |

FOREIGN PATENTS

| 655,775 | 8/1955 | Great Britain. |
| 796,660 | 6/1958 | Great Britain. |
| 120,361 | 5/1959 | Russia. |

RICHARD C. QUEISSER, Primary Examiner.

J. P. BEAUCHAMP, J. J. GILL, Assistant Examiners.